Patented Nov. 9, 1937

2,098,385

UNITED STATES PATENT OFFICE 2,098,385

RECLAIMING METHOD

Fred W. Hall, Nutley, and Norman R. Wilson, Belleville, N. J., assignors, by mesne assignments, to The Stamford Rubber Supply Company, Stamford, Conn., a corporation of Connecticut No Drawing. Application September 30, 1936, Serial No. 103,368

2 Claims. (Cl. 106—23)

This invention deals with the production in form more finely divided than heretofore, and in a superior condition for usage, of certain materials such as used by the trade as an ingredient in making certain products.

For instance, those engaged in manufacturing certain rubber products such as erasers and water proofed fabrics desire that these products shall possess certain specific physical properties; and to realize these, the products are compounded partly of natural or synthetic rubber and partly of so-called rubber substitute together with other compounding ingredients. These ingredients are mixed with vulcanizing material such as sulphur, whereby the mixture may be formed into a coherent mass by vulcanization.

The so-called rubber substitute is a drying or semi-drying vegetable oil which has been vulcanized to the extent of becoming a more or less elastic solid; after which it has, in accordance with heretofore practice been crushed between granite rolls until reduced to particles which the rubber manufacturer can mix and work together with the requisite proportion of raw rubber and other materials and then vulcanize together.

From the standpoint of the rubber manufacturer, the so-called rubber substitute should preferably be as finely divided as possible, to facilitate mixing with the other ingredients; and for the purpose of economy may contain certain other desirable ingredients.

One possible source of such a desirable ingredient is the scrap from the manufacture of certain rubber articles or scrap pieces of rubber substitute. However, this material to be suitable, must also be finely divided, and by reason of the sizes and irregularities of shape in which it is to be had, and its tenacity, its comminution to the desirable fineness has not been satisfactorily accomplished.

The existing practice of coarsely pulverizing the scrap, on the one hand, and of crushing the vulcanized oil, on the other hand, and then mixing together these separately reduced materials has not resulted in the most satisfactory product, on account of the coarseness of the finished products.

Now this invention proposes a continuous or cyclic method whereby the scrap may be readily reclaimed and at once produced in a very fine state of division thoroughly mixed with equally comminuted vulcanized oil; all as a powder like product in the best physical state for usage by the purchaser.

In carrying out this method, no attempt is made separately to comminute the scrap, but it is put in sizable pieces in a receptacle, preferably of slab-like proportions. Then this receptacle is filled with the oil which has first been mixed with an agent which will cause vulcanization to take place so as to produce a slab or cake in which the pieces of scrap are bonded together in a matrix of vulcanized oil.

This slab when set is now ready to be comminuted, but instead of crushing it between rollers, its major portion is progressively reduced to a fine powder by feeding it end-wise against an abrasive wheel of the desired grit. A medium grade wheel will be found to be quite satisfactory. When the major portion of the slab has been thus reduced, the remainder (which is the small end piece held by the means for holding the slab against the abradant), is treated as scrap; being returned to the receptacle for bonding into the next slab being made, either alone or with additional scrap, and the cycle of operations is continued indefinitely.

The preferred technique regarding the production of "white rubber substitute" will be given by way of example. The oil used is of the drying or semi-drying vegetable type such as rape-seed oil, soya-bean oil, etc. It is mixed with a suitable vulcanizer, such as sulphur monochloride and some neutralizer for such acid as may form. A satisfactory proportion is 23 parts by weight of sulphur mono-chloride, 100 parts by weight of rape-seed oil, and 2 parts by weight of magnesium carbonate.

This fluid mixture is made and then run into the receptacle containing the scrap. The receptacle is arranged to be cooled by regulation because the vulcanizing takes place spontaneously and generates heat which should be dissipated to prevent discoloring of the product; the vulcanization proceeding to the extent of producing a hardness in the product represented by a reading of 45—50 on an instrument known as the Shore durometer.

For the production of "brown rubber substitute" 100 parts of rape-seed oil, 18–20 parts of ground sulphur, and ½ part of magnesium oxide, may be used. This is heated at 150° C. for about an hour and a half, and results in a solid vulcanized product. It is vulcanized with scrap, and reduced to powder in the same manner and through the same continuous cycle, as has been described in the foregoing.

It will be perceived that this method enables scrap rubber, whether raw or vulcanized, natural or synthetic to be effectively utilized in the production of powdered rubber substitute. The difficulty heretofore confronting those desiring to utilize such scrap, because of its wide variety of sizes and shapes (ranging from very small pieces to relatively large ones) has now been overcome, and the method is equally available however gritty or tough the scrap may be. Since it obviates all need for first devulcanizing or otherwise treating it, it is applicable to such materials as have heretofore been discarded as incapable of being reclaimed; such as vulcanized synthetic rubber.

We claim as our invention:

1. The method of cyclically reclaiming and reducing to a fine powder rubber like scrap whether raw or vulcanized, natural or synthetic which consists in bringing together said scrap and a quantity of vulcanizable oil; then effecting a vulcanization of said oil to solidify it and form together with said scrap a large cake; then progressively abrading away the major portion of said cake, then again treating as scrap the residual portion of said cake as aforesaid with fresh quantities of vulcanizable oil; and continuing the sequence of operations.

2. The method of producing rubber substitute in a finely divided state which consists of filling the interstices of a batch of rubber like scrap whether raw or vulcanized, natural or synthetic in sizable pieces with vegetable oil embodying a vulcanizing agent; forming said scrap and oil into a large coherent cake through vulcanization of said oil; and progressively abrading away the cake to simultaneously reduce the vulcanized oil and the pieces of scrap held thereby into a powdery mixture.

FRED W. HALL.
NORMAN R. WILSON.